Dec. 2, 1947.  G. A. LYON  2,431,699
ORNAMENTAL WHEEL TRIM RING
Filed Nov. 13, 1945
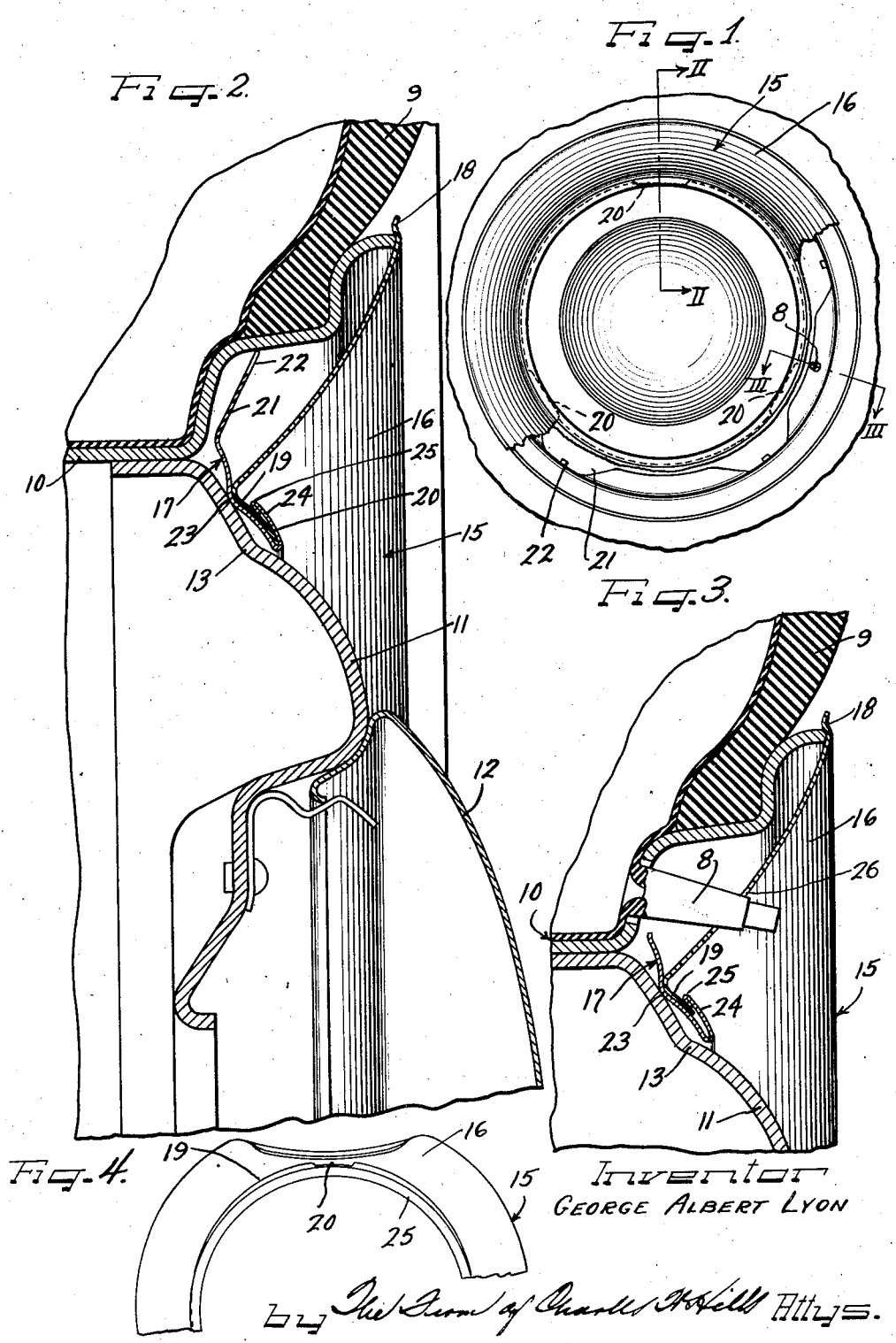
Inventor
GEORGE ALBERT LYON Patented Dec. 2, 1947

2,431,699

UNITED STATES PATENT OFFICE 2,431,699

ORNAMENTAL WHEEL TRIM RING

George Albert Lyon, Allenhurst, N. J.

Application November 13, 1945, Serial No. 628,221

10 Claims. (Cl. 301—37)

This invention relates to an automobile wheel structure, and more particularly to an ornamental wheel trim therefor.

An object of this invention is to provide a simplified form of automobile wheel trim comprising a composite plastic and metal ring which is relatively simple and lends itself to economical manufacture on a large production scale.

Another object of this invention is to provide an ornamental plastic wheel trim ring wherein a metal retaining ring is uniquely connected to the trim ring for holding the same on the wheel.

Yet another object of the invention relates to the provision of novel interconnecting means between a plastic trim ring and a concealed metal ring for holding the same on the wheel.

In accordance with the general features of this invention there is provided a composite article of manufacture comprising an annular plastic ornamental trim ring having divergent tabs on an inner periphery and a metal ring disposed therebehind, and having an outwardly turned portion in which the tabs are adapted to be interlocked and which turned portion is adapted to reinforce and ornament the inner periphery of the plastic ring.

Another feature of the invention relates to the manner in which the tabs are progressively inserted in a groove in the retaining ring and whereby at least one of the tabs must be flexed in order for it to be sprung into the groove after the other tabs have been inserted therein.

Other objects and features of this invention will more fully appear from the following detail description taken in connection with the accompanying drawings which illustrate a single embodiment thereof and in which Figure 1 is a fragmentary side view of an automobile wheel showing my ornamental trim applied thereto;

Figure 2 is an enlarged fragmentary cross-sectional view taken on the line II—II of Figure 1 looking in the direction indicated by the arrows;

Figure 3 is an enlarged fragmentary cross-sectional view similar to Figure 2 but taken on the line III—III of Figure 1 looking in the direction indicated by the arrows; and Figure 4 is a fragmentary detail view taken generally from the outer side of the trim ring and showing how one of the three tabs of the plastic ring is adapted to be sprung over the turned edge of the metal ring after the other tabs have been inserted therebehind.

As shown on the drawing:

The reference character 9 designates generally a conventional automobile tire and tube mounted upon the usual multi-flange drop center type of tire rim 10. This tire rim, as shown in Figure 3, is adapted to have extended therethrough in the usual way a valve stem 8.

The tire rim is supported upon a metal load bearing or body part 11 which has detachably fastened to its central portion in a conventional way a detachable hub cap 12. Since the hub cap and its retention means is not involved in this invention, no detailed description of the same is believed necessary.

The body part has a slight annular indentation at 13 where the inner margin of a composite trim ring 15, embracing the features of this invention, is adapted to seat. It is with this trim ring that my present invention is principally concerned.

The trim ring 15 comprises an annular plastic outer ring 16 and an inner generally concealed metal retaining ring 17. The plastic trim ring 16 has its outer edge slightly turned at 18 so as to overhang an edge of the tire rim in close proximity to a side wall of the tire. This plastic trim ring 16 extends generally radially and axially inwardly from the turned edge 18 to the body part 11 where it is turned into a divergent portion 19.

The divergent portion 19 is inclined at an angle to the main body of the ring 16 and is formed into a plurality of equidistantly spaced tabs 20 which are adapted to be interlocked with an inner portion of the metal ring 17 in a manner embodying the features of this invention. It should be noted at this time that the plastic trim 16 may be made of any suitable thermoplastic material, although I contemplate that excellent results may be attained by making the same of ethyl cellulose, cellulose acetate or vinyl resins. As distinguished therefrom the ring 17 may be made of any suitable springy metal although it is contemplated that excellent results may be obtained by making the same out of stainless steel or 18.8 steel. This ring 17 has its peripheral portion formed into a plurality of circumferentially spaced retaining fingers 21 adapted to be pressed axially into retaining cooperation with one of the flanges of the tire rim as shown in Figure 2.

Each of these fingers may be notched at 22, as shown in Figure 1, for receiving the end of a screw driver whereby the ring may be pried free from the wheel. To effect this an outer portion of the plastic ring 16 must first be slightly deflected away from the wheel in order to permit a screw driver to be inserted therebehind and into the notch 22.

It is to be borne in mind that the material of which the ring 16 is made is of a type that is readily deflectable without permanent deformation. That is to say, an operator can manually grip the turned edge 18 and pull a portion of it away from the wheel; and upon release of the same, this deflected portion will return to its initial position or contour.

The metal ring 17 is provided with a radially inner angular portion 23 against which the turned inner margin 19, including the tabs 20 of the ring 16, is adapted to bottom. The extreme margin of the metal ring is turned back upon itself, as at 24, thereby defining a groove between the turned back portion 24 and the angular portion 23 in which the tabs 20 of the plastic ring are adapted to be inserted.

In actual practice, as shown in my copending application, Serial No. 628,222, filed November 13, 1945, all but one of the tabs 20 are first inserted in the groove of the metal ring and thereafter, as shown in Figure 4, the portion of the plastic ring opposite the tab 20 that has not been inserted, is flexed so as to permit of this remaining tab being snapped into the groove. The reason this is necessary is because the radially inner extremity of the tabs are located in a circle of a diameter less than the outermost extremity 25 of the turned inner margin 24 of the metal ring.

In this manner the inner tabs 20 of the plastic ring 16 may be easily positioned within the annular pocket of the metal ring. Thereafter, the turned portion 24 of the metal ring may be flattened against the tabs to permanently affix the two rings together.

Attention is directed to the fact that if it is so desired, the plastic trim ring 16 may be apertured at 26 so as to permit of the valve stem 8 extending therethrough (Figure 3). On the other hand, if a shorter valve stem is used, access may be had to the valve stem by flexing a portion of the plastic ring away from the wheel. This flexing of the margin of the ring 16 does not in any way disturb the gripping engagement of the fingers 21 of the retaining ring 17. Moreover, the flexed portion of the trim ring 16 is, in reality, movable on and relative to the angular reinforcing metal portion 23 of the retaining ring 17.

For the most part, the metal ring 17 is concealed by the trim ring 16. Only the turned portion 24 of the metal ring is visible and this may be given a highly lustrous finish for the purpose of giving the ring 16 the appearance of having a lustrous metallic bead on its inner periphery.

The plastic trim ring 16 is of such radial depth and cross-sectional contour that, in use, it appears to constitute a continuation of the side wall of the tire 9. This illusion can be accentuated by providing the ring 16 with a white external finish in which event it will appear to constitute a white side wall part of the tire.

The trim ring 15 is easily applicable to the wheel by aligning the valve stem 8 with the hole 26 in the ring and then pressing the ring home until the metal fingers 21 are in gripping engagement with the flange of the tire rim. Removal of the ring 15 may be effected by first flexing a portion of the plastic section 16 and then inserting an edge of a pry-off tool in a slot 22 whereby the entire ring 15 may be forcibly pried off the wheel.

I claim as my invention:

1. As a composite article of manufacture, a circular automobile wheel trim comprising a metal circular retaining member having a continuous turned edge and a plastic ring having a plurality of radially inwardly projecting tabs, the inner extremities of said tabs being located in a circle of lesser diameter than that of said turned edge, said turned edge defining a groove between it and the main body of the metal member in which said tabs are all disposed, at least a portion of said plastic ring being deflectable for enabling the initial insertion of all of the tabs in the groove and for subsequently enabling access to the ring therebehind when the article is disposed on an automobile wheel.

2. As a composite article of manufacture, a circular automobile wheel trim comprising a metal circular retaining member having a continuous turned edge and a plastic ring having a plurality of radially inwardly projecting tabs, the inner extremities of said tabs being located in a circle of lesser diameter than that of said turned edge, said turned edge defining a groove between it and the main body of the metal member in which said tabs are all disposed, at least a portion of said plastic ring being deflectable for enabling the initial insertion of all of the tabs in the groove and for subsequently enabling access to the ring therebehind when the article is disposed on an automobile wheel, said turned edge being flattened against said tabs to permanently affix the plastic ring to the circular member.

3. As a composite article of manufacture, a circular automobile wheel trim comprising a metal circular retaining member having a continuous turned edge and a plastic ring having a plurality of radially inwardly projecting tabs, the inner extremities of said tabs being located in a circle of lesser diameter than that of said turned edge, said turned edge defining a groove between it and the main body of the metal member in which said tabs are all disposed, at least a portion of said plastic ring being deflectable for enabling the initial insertion of all of the tabs in the groove and for subsequently enabling access to the ring therebehind when the article is disposed on an automobile wheel, said member and ring being concentric and both extending radially outwardly from the junction between the turned edge and the tabs.

4. In a wheel structure including a wheel having a flanged tire rim and a load bearing member, an ornamental trim comprising concentric plastic and metal rings with the plastic ring disposed over the major portion of the metal ring and extending over the flanges of the rim to the body member, said metal ring being provided on its outer periphery with retaining fingers for engagement with a flange of the tire rim and the inner periphery of the metal ring being turned back upon itself and over a radially inner portion of the plastic ring to secure the two rings together, the turned back portion of the metal ring being disposed on the outer side of the plastic ring at its inner margin and forming an ornamental annular bead on the plastic ring.

5. In a wheel structure including a wheel having a flanged tire rim and a load bearing member, an ornamental trim comprising concentric plastic and metal rings with the plastic ring disposed over the major portion of the metal ring and extending over the flanges of the rim to the body member, said metal ring being provided on its outer periphery with retaining fingers for engagement with a flange of the tire rim and the inner periphery of the metal ring being turned back upon itself and over a radially inner portion of the plastic ring to secure the two rings together, the turned back portion of the metal ring being disposed on the outer side of the plastic ring at its inner margin and forming an ornamental annular bead on the plastic ring, said plastic ring having spaced tabs overlapped by the turned inner portion of the metal ring and which tabs extend in a divergent direction from that of the main body of the plastic ring.

6. In a wheel structure including a wheel having a flanged tire rim and a load bearing member, an ornamental trim comprising concentric plastic and metal rings with the plastic ring disposed over the major portion of the metal ring and extending over the flanges of the rim to the body member, said metal ring being provided on its outer periphery with retaining fingers for engagement with a flange of the tire rim and the inner periphery of the metal ring being turned back upon itself and over a radially inner portion of the plastic ring to secure the two rings together, the turned back portion of the metal ring being disposed on the outer side of the plastic ring at its inner margin and forming an ornamental annular bead on the plastic ring, said metal ring having an inner margin formed into an annular seat portion adapted to bear on the body part and said plastic ring having its inner portion turned angularly outwardly therefrom and formed into tabs nested on said seat and interlocked therewith by said turned portion of the metal ring.

7. As a composite article of manufacture, a circular automobile wheel trim comprising a metal circular retaining member having a radially inner continuous turned edge portion and a trim ring having a radially inner turned section the innermost extremity of said turned section being located in a circle of a lesser diameter than that of said turned edge portion, said turned edge portion defining a groove between it and the main body of the retaining member in which said section is disposed, at least a portion of said section being resiliently deflectable for enabling the initial insertion of the same in said groove.

8. As a composite article of manufacture, a circular automobile wheel trim comprising a metal circular retaining member having a radially inner continuous turned edge portion and a trim ring having a radially inner turned section, the innermost extremity of said turned section being located in a circle of a lesser diameter than that of said turned edge portion, said turned edge portion defining a groove between it and the main body of the retaining member in which said section is disposed, at least a portion of said section being resiliently deflectable for enabling the initial insert of the same in said groove, said edge portion and section being flattened together to lock-seam the retaining member and the ring together in a unitary wheel trim structure.

9. In a composite wheel cover for a wheel including a multi-flanged tire rim and a load sustaining body part, a trim ring cover member of a magnitude and extent to cover the outer side of the tire rim and the wheel body adjacent juncture thereof with the tire rim, said trim ring having a generally radially inwardly and axially outwardly extending inner marginal flange structure, and a retaining ring having generally radially and axially outwardly extending fingers for retaining engagement with a flange of the tire rim and a radially inwardly and axially outwardly extending inner marginal flange structure generally complementary to the inner marginal flange structure of the trim ring and fixedly interconnected therewith, the intermediate portion of said retaining ring comprising an annular generally radially extending reinforcing formation extending divergently from the juncture of said trim ring with the retaining ring, there being a seating groove between said reinforcing formation and the radially inner marginal flange structure of the retaining ring with the shoulder formed by the juncture of the inner marginal flange structure of the trim ring with the body of the trim ring seating in said groove and being fixedly retained in said groove by the interconnection of the inner marginal flange structures.

10. A wheel cover as defined in claim 9 wherein the inner marginal flange structure of the trim ring has an interconnecting return bent portion clampingly engaging the inner marginal portion of the trim ring and lying substantially parallel therewith.

GEORGE ALBERT LYON.

REFERENCES CITED

The following references are of record in the file of this patent:

UNITED STATES PATENTS

| Number | Name | Date |
| --- | --- | --- |
| 2,345,283 | Mulhern | Mar. 28, 1944 |
| 1,948,273 | Lyon | Feb. 20, 1934 |
| 2,368,230 | Lyon | Jan. 30, 1945 |